US008705210B2

(12) United States Patent  
Arai

(10) Patent No.: US 8,705,210 B2  
(45) Date of Patent: Apr. 22, 2014

(54) INTERLEAVED CIRCUIT OF FLEXURE FOR DISK DRIVE

(71) Applicant: NHK Spring Co., Ltd., Yokohama (JP)

(72) Inventor: Hajime Arai, Aiko-gun (JP)

(73) Assignee: NHK Spring Co., Ltd., Tokyo (JP)

( * ) Notice: Subject to any disclaimer, the term of this patent is extended or adjusted under 35 U.S.C. 154(b) by 0 days.

(21) Appl. No.: 13/733,317

(22) Filed: Jan. 3, 2013

(65) Prior Publication Data

US 2013/0176645 A1 Jul. 11, 2013

(30) Foreign Application Priority Data

Jan. 5, 2012 (JP) ................................ 2012-000531

(51) Int. Cl.
*G11B 5/48* (2006.01)
(52) U.S. Cl.
USPC ...................................................... 360/245.9
(58) Field of Classification Search
USPC .................... 360/245.8, 245.9, 246, 244.1
See application file for complete search history.

(56) References Cited

U.S. PATENT DOCUMENTS

| 5,717,547 | A | 2/1998 | Young | |
| 6,249,404 | B1* | 6/2001 | Doundakov et al. | 360/245.4 |
| 8,111,483 | B2 | 2/2012 | Arai | |
| 8,300,363 | B2* | 10/2012 | Arai et al. | 360/245.8 |
| 8,488,279 | B1* | 7/2013 | Pan et al. | 360/245.9 |
| 2010/0290160 | A1* | 11/2010 | Arai | 360/245.8 |
| 2011/0048791 | A1* | 3/2011 | Ohsawa et al. | 174/267 |
| 2011/0149441 | A1* | 6/2011 | Alex et al. | 360/245.8 |
| 2012/0081815 | A1* | 4/2012 | Arai et al. | 360/245.8 |
| 2013/0107488 | A1* | 5/2013 | Arai | 361/790 |
| 2013/0141821 | A1* | 6/2013 | Pro et al. | 360/245.9 |
| 2013/0176646 | A1* | 7/2013 | Arai | 360/245.8 |

FOREIGN PATENT DOCUMENTS

JP 2010-267334 A 11/2010

OTHER PUBLICATIONS

U.S. Appl. No. 13/733,352, filed Jan. 3, 2013; First Named Inventor: Hajime Arai: Title: "Interleaved Circuit of Flexure for Disk Drive".

* cited by examiner

*Primary Examiner* — Will J Klimowicz
(74) *Attorney, Agent, or Firm* — Holtz, Holtz, Goodman and Chick, PC

(57) ABSTRACT

An interleaved circuit has first branch conductors branching from a first conductor, second branch conductors branching from a second conductor, a metal base having an opening, an insulating layer formed on the metal base, an electrically insulating first cover resin layer, and an electrically insulating second cover resin layer. The first branch conductors are formed on the insulating layer. The first branch conductors are covered by the first cover resin layer. The second branch conductors are formed on the first cover resin layer. The second branch conductors are individually located between the first branch conductors. The second branch conductors are covered by the second cover resin layer.

15 Claims, 11 Drawing Sheets

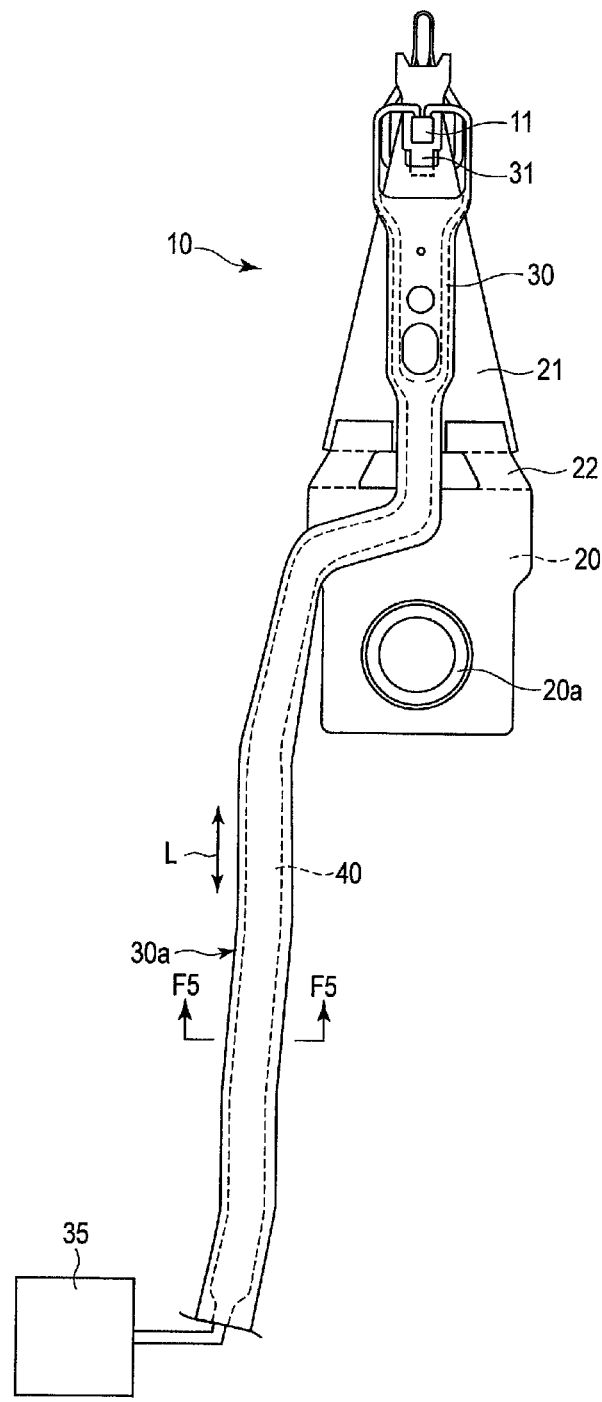
F I G. 3

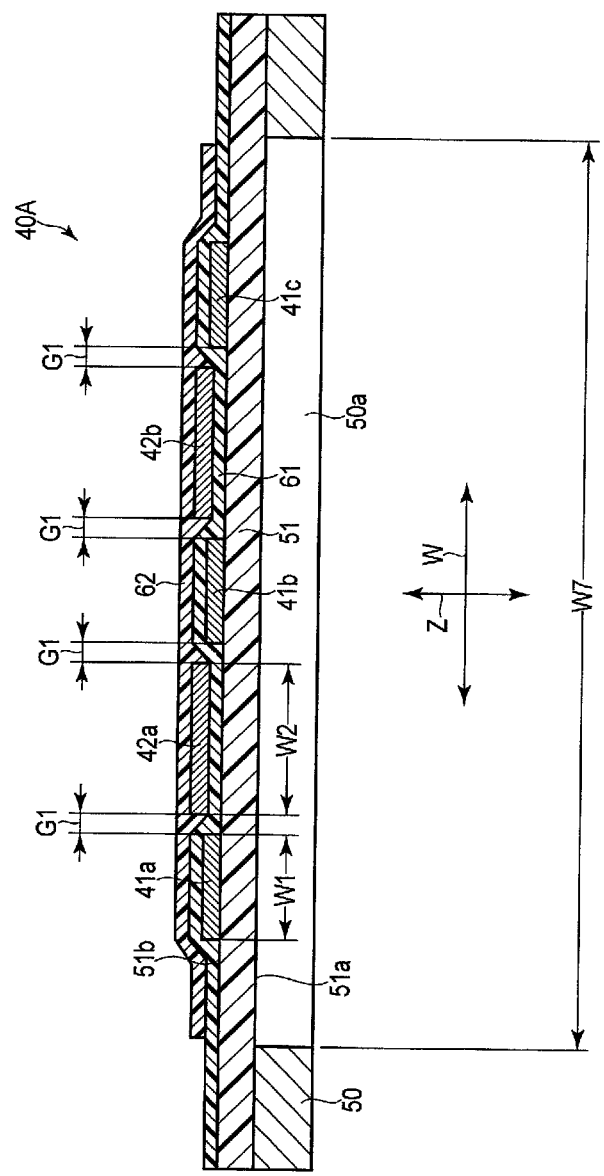
F I G. 5

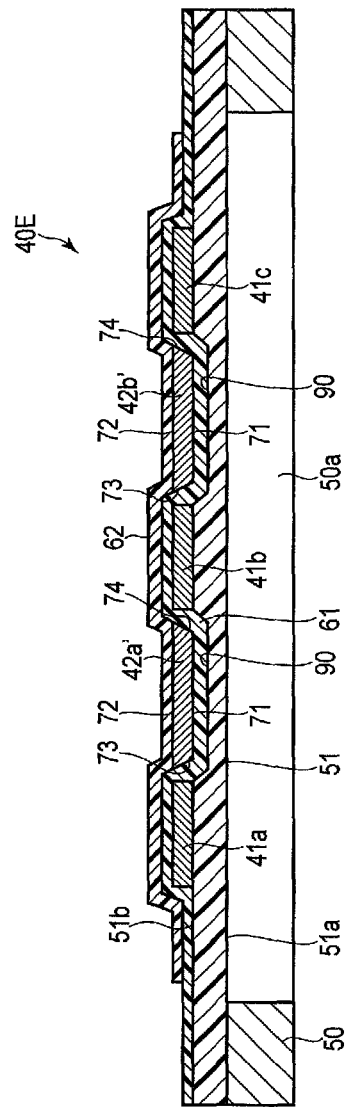
F I G. 11

INTERLEAVED CIRCUIT OF FLEXURE FOR DISK DRIVE

CROSS-REFERENCE TO RELATED APPLICATIONS

This application is based upon and claims the benefit of priority from prior Japanese Patent Application No. 2012-000531, filed Jan. 5, 2012, the entire contents of which are incorporated herein by reference.

BACKGROUND OF THE INVENTION

1. Field of the Invention

This invention relates to an interleaved circuit of a flexure used in a disk drive for an information processing apparatus, such as a personal computer.

2. Description of the Related Art

A hard disk drive (HDD) is used in an information processing apparatus, such as a personal computer. The HDD comprises a magnetic disk rotatable about a spindle, a carriage turnable about a pivot, etc. A disk drive suspension is disposed on an arm of the carriage.

The disk drive suspension comprises a baseplate, load beam, etc. A flexure is disposed on the load beam. A slider is mounted on a gimbal portion formed near the distal end of the flexure. The slider is provided with elements (transducers) for accessing data, that is, for reading or writing data. The suspension, flexure, etc., constitute a head gimbal assembly.

Flexures are practically available in various forms depending on required specifications. A flexure with conductors is a known example. A circuit of the flexure of this type comprises a metal base, insulating layer formed on the metal base, a plurality of conductors formed on the insulating layer, etc. The metal base is formed of a thin stainless-steel plate. The insulating layer consists mainly of an electrically insulating material, such as polyimide. Each conductor is a copper member, one end of which is connected to en element (e.g., magnetoresistive element) of a slider. The other end of the conductor is connected to an amplifier or the like of a disk drive.

The circuit of the flexure is expected to be reduced in impedance, in order to match the amplifier with the element of the slider and reduce energy consumption. A reduction in inductance is also required. To achieve high-speed data transfer, moreover, such characteristics (low-attenuation characteristics) are required that the attenuation is low even in a high-frequency range.

These requirements can be effectively satisfied by a flexure with conductors that comprises multi-trace transmission lines. A circuit with multi-trace transmission lines is also called an interleaved circuit. A flexure comprising an interleaved circuit is disclosed in U.S. Pat. No. 5,717,547. Flexures with interleaved circuits are suitable for high-speed data transfer due to their low attenuation in a high-frequency band.

FIGS. 13 and 14 show an example of an interleaved circuit 100. This interleaved circuit 100 comprises two first branch conductors 101a and 101b branching from a first conductor 101 and two second branch conductors 102a and 102b branching from a second conductor 102. As shown in FIG. 14, an insulating layer 111 is formed on a metal base 110. All the branch conductors 101a, 101b, 102a and 102b are located on the insulating layer 111. These branch conductors 101a to 102b are covered by a cover resin layer 112.

Each of the conductors of the interleaved circuit shown in FIGS. 13 and 14 is bifurcated. However, an investigation conducted by the inventors of the present invention revealed that further impedance reduction can be achieved by increasing the number of branch conductors and minimizing the distance between the branch conductors.

In the conventional interleaved circuit, however, all the branch conductors are located on the same plane. In this arrangement, the distance between the branch conductors cannot be reduced unlimitedly, due to the use of resists for the formation of the branch conductors by etching or plating. In the prior art example (FIG. 14), all the branch conductors 101a to 102b are formed on the insulating layer 111. In this case, the width of a resist formed between each two adjacent branch conductors cannot be reduced unlimitedly. Thus, distance $G_0$ between the branch conductors is 15 μm or more.

If all the branch conductors are located on the same plane of the insulating layer to reduce impedance, as described above, the interleaved circuit is so wide that the design flexibility of a flexure with conductors is limited.

BRIEF SUMMARY OF THE INVENTION

Accordingly, the object of the present invention is to provide an interleaved circuit of a flexure for a disk drive, capable of being reduced in impedance and prevented from becoming wide.

One embodiment is an interleaved circuit of a flexure for a disk drive, which comprises a first conductor and a second conductor. The interleaved circuit comprises a metal base comprising an opening, an electrically insulating layer, a plurality of first branch conductors branching from the first conductor, second branch conductors branching from the second conductor, an electrically insulating first cover resin layer, and an electrically insulating second cover resin layer. The insulating layer is located overlapping that region of the metal base which comprises the opening and comprises a first surface facing the metal base and a second surface opposite to the first surface. The first branch conductors are arranged at predetermined intervals on the second surface of the insulating layer. The first cover resin layer covers the first branch conductors and the insulating layer. The second branch conductors are formed individually between the adjacent first branch conductors on the first cover resin layer by plating or the like. The second cover resin layer covers the second branch conductors and the first cover resin layer.

According to this arrangement, the interleaved circuit can be reduced in impedance and prevented from becoming wide.

In the one embodiment, each of the second branch conductors may comprise a first flat surface portion in contact with the first cover resin layer, a second flat surface portion opposite to the second flat surface portion, and opposite side surfaces, the opposite side surfaces being inclined so that a distance therebetween increases with distance from the first flat surface portion toward the second flat surface portion. Further, each of the first branch conductors may comprise a first flat surface portion in contact with the insulating layer, a second flat surface portion opposite to the first flat surface portion, and opposite side surfaces, the opposite side surfaces being inclined so that a distance therebetween decreases with distance from the first flat surface portion of the first branch conductors toward the second flat surface portion.

The insulating layer may comprise recesses formed individually in those parts of the second surface between the first branch conductors, and the second branch conductors may be located in positions individually corresponding to the recesses with the first cover resin layer therebetween. Alternatively, the second branch conductors may be one less in number than the first branch conductors and be located individually between the adjacent first branch conductors. In this case, each of the second branch conductors may be wider than each of the first branch conductors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a plan view of a head gimbal assembly comprising a flexure for a disk drive according to a first embodiment;

FIG. 5 is a partial sectional view of the interleaved circuit taken along line F5-F5 of FIG. 3;

FIG. 11 is a sectional view of an interleaved circuit according to a fifth embodiment;

DETAILED DESCRIPTION OF THE INVENTION

A first embodiment will now be described with reference to FIGS. 1 to 5.

Figure 1:
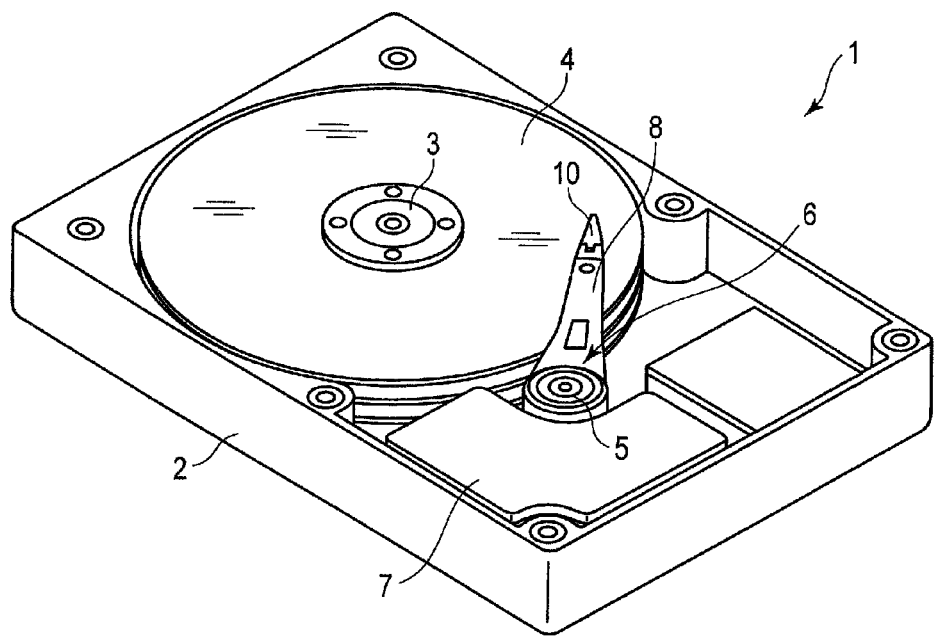
FIG. 1 is a perspective view showing an example of a disk drive with suspensions.

A hard disk drive (hereinafter referred to as the disk drive) 1 shown in FIG. 1 comprises a case 2, spindle 3, magnetic disks 4, pivot 5, carriage 6, and positioning motor 7. The magnetic disks 4 are rotatable about the spindle 3, while the carriage 6 is turnable about the pivot 5. The positioning motor 7 serves to turn the carriage 6. The case 2 is sealed by a lid (not shown).

Figure 2:
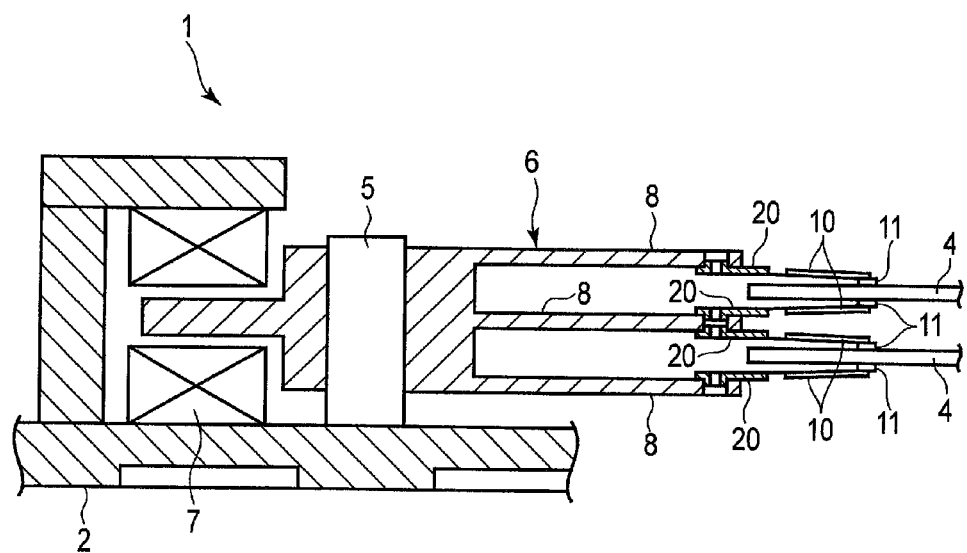
FIG. 2 is a partial sectional view of the disk drive shown in FIG. 1.

FIG. 2 is a sectional view schematically showing a part of the disk drive 1. As shown in FIG. 2, the carriage 6 comprises a plurality (e.g., three) of actuator arms 8. A suspension 10 is mounted on the distal end portion of each arm 8. A slider 11, which constitutes a magnetic head, is disposed on the distal end of the suspension 10.

Each magnetic disk 4 is rotated about the spindle 3 at high speed, an air bearing is formed between the disk and the slider 11. If the carriage 6 is turned by the positioning motor 7, the slider 11 can be moved to a desired track of the disk 4. Elements, such as magnetoresistive elements (MR elements) capable of conversion between electrical and magnetic signals, are disposed on the slider 11. These elements serve to access a recording surface of the disk 4, that is, write or read data to or from the disk.

FIG. 3 shows an example of a head gimbal assembly comprising the suspension 10. The suspension 10 comprises a baseplate 20, load beam 21, hinge portions 22, etc. A boss portion 20a of the baseplate 20 is secured to its corresponding arm 8.

A flexure with conductors 30 is disposed on the suspension 10. The flexure with conductors 30 will hereinafter be referred to simply as the flexure 30. The flexure 30 is located along the load beam 21 and secured to the load beam 21 by fixing means, such as laser spot welding. A tongue 31 that functions as a gimbal portion is formed near the distal end portion of the flexure 30. The slider 11 is mounted on the tongue 31. A rear portion (tail portion) 30a of the flexure 30 extends rearward relative to the baseplate 20 and toward an amplifier 35.

A circuit 40 that extends longitudinally (in the direction indicated by arrow L in FIG. 3) relative to the flexure 30 of the suspension 10 is disposed on the flexure 30. One end of the circuit 40 is connected to the elements of the slider 11 that functions as a magnetic head. The other end of the circuit 40 is connected to the amplifier 35 (FIG. 3) of the disk drive 1 through a circuit board or junction circuit. The circuit 40 comprises an interleaved circuit 40A, which will be described below.

Figure 4:
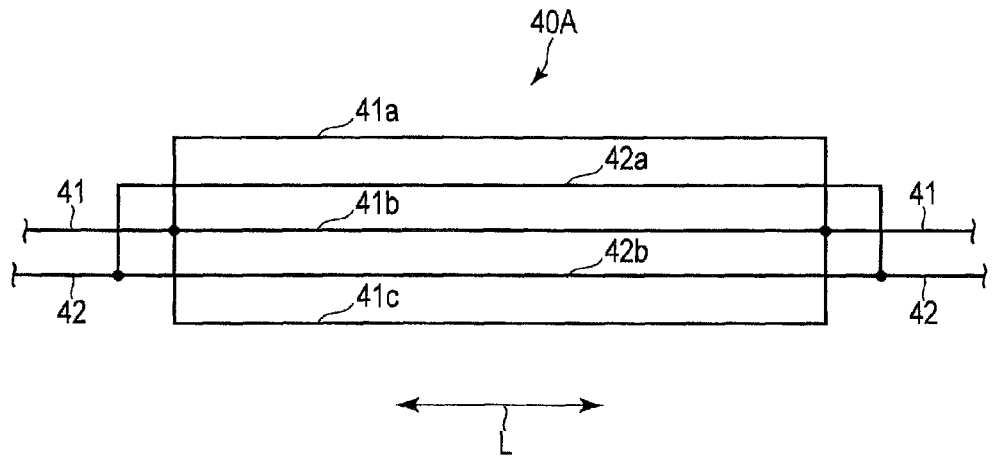
FIG. 4 is a circuit diagram schematically showing an interleaved circuit of the disk drive flexure shown in FIG. 3.

FIG. 4 is a circuit diagram schematically showing the interleaved circuit 40A. Arrow L in FIG. 4 indicates the longitudinal direction of the flexure 30, that is, the longitudinal direction of the interleaved circuit 40A. The interleaved circuit 40A comprises a first conductor 41 (e.g., positive) and second conductor 42 (e.g., negative). The first conductor 41 is branched into three parts, which constitute first branch conductors 41a, 41b and 41c, individually. The second conductor 42 is branched into two parts, which constitute second branch conductors 42a and 42b, individually. Thus, the second branch conductors 42a and 42b are one le in number than the first branch conductors 41a to 41c.

FIG. 5 shows a cross-section of the interleaved circuit 40A in the transverse direction. Arrow W in FIG. 5 indicates the transverse direction of the interleaved circuit 40A. Arrow Z indicates the thickness direction of the interleaved circuit 40A.

As shown in FIG. 5, the interleaved circuit 40A comprises a metal base 50, an insulating layer 51 formed on the metal base 50, the first branch conductors 41a, 41b and 41c formed on the insulating layer 51, a first cover resin layer 61, the second branch conductors 42a and 42b formed on the first cover resin layer 61, and a second cover resin layer 62. The insulating layer 51 and the cover resin layers 61 and 62 all consist mainly of an electrically insulating resin, such as polyimide. An opening 50a is formed in the metal base 50. The opening 50a extends longitudinally relative to the flexure 30.

The metal base 50 is formed of a metal plate of, for example, stainless steel. The thickness of the metal base 50 is smaller than that of the load beam 21 and is adjusted to, for example, 15 to 20 µm (e.g., 18 µm). The thickness of the load beam 21 is adjusted to, for example, 30 to 62 µm.

Width W1 of each of the first branch conductors 41a to 41c is, for example, 30 µm. Width W2 of each of the second branch conductors 42a and 42b is, for example, 45 µm. Thus, width W2 of the second branch conductors 42a and 42b is greater than width W1 of the first branch conductors 41a to 41c. The thickness of each of the first branch conductors 41a to 41c and second branch conductors 42a and 42b is, for example, 5 µm. The respective cross-sections of the first branch conductors 41a to 41c and second branch conductors 42a and 42b are substantially rectangular. The thickness of the insulating layer 51 is, for example, 10 µm, and that of each of the cover resin layers 61 and 62 is, for example, 4 µm.

The insulating layer 51 is located overlapping that region of the metal base 50 which covers the opening 50a. The insulating layer 51 comprises a first surface 51a that faces the metal base 50 and a second surface 51b opposite to the first surface 51a.

As shown in FIG. 5, the first branch conductors 41a to 41c are located at predetermined intervals (e.g., 55 µm) on the second surface 51b of the insulating layer 51 in substantially parallel relationship to one another. The first branch conductors 41a to 41c and insulating layer 51 are covered by the first cover resin layer 61.

The second branch conductors 42a and 42b are formed on the first cover resin layer 61. Of these second branch conductors, the one second branch conductor 42a is located between the adjacent first branch conductors 41a and 41b in substantially parallel relation thereto. The other second branch conductor 42b is located between the adjacent first branch conductors 41b and 41c in substantially parallel relation thereto. The second branch conductors 42a and 42b and first cover resin layer 61 are covered by the second cover resin layer 62.

The first branch conductors 41a to 41c and second branch conductors 42a and 42b are made of a highly electrically conductive metal, such as plated copper. The first branch conductors 41a to 41c are formed into a predetermined pattern along the second surface 51b of the insulating layer 51 by, for example, plating. The second branch conductors 42a and 42b are formed into a predetermined pattern along the first cover resin layer 61 by, for example, plating. The first branch conductors 41a to 41c and second branch conductors 42a and 42b are located substantially parallel to one another. These branch conductors 41a to 42b extend longitudinally relative to the flexure 30 in longitudinal direction (reference wiring direction) L of the interleaved circuit 40A.

The following is a description of manufacturing processes for the interleaved circuit 40A.

The first branch conductors 41a to 41c of the predetermined pattern are formed on the insulating layer 51 by plating or etching. Thereafter, the first cover resin layer 61 is coated on the first branch conductors 41a to 41c and insulating layer 51 to cover them. Thereafter, a resist corresponding to the pattern of the second branch conductors 42a and 42b is formed on the first cover resin layer 61.

This resist is formed on the first cover resin layer 61 that covers the first branch conductors 41a to 41c. Therefore, the resist can be formed so that the first branch conductors 41a to 41c are located close enough to the second branch conductors 42a and 42h. Thus, the distance (interconductor distance 21 shown in FIG. 5) from the second branch conductors 42a and 42b on the first cover resin layer 61 to their adjacent first branch conductors 41a to 41c can be adjusted to a small value, e.g., 3 to 5 µm. The impedance of the interleaved circuit 40A can be considerably reduced by reducing interconductor distance G1.

In present embodiment, the thickness (e.g., 5 µm) of each of the first branch conductors 41a to 41c is equal to that of each of the second branch conductors 42a and 42b. Further, the distance (interconductor distance G1) between the first branch conductors 41a to 41c and second branch conductors 42a and 42b is adjusted to this thickness or less (e.g., 3 to 5 µm).

The second branch conductors 42a and 42b are formed on the first cover resin layer 61 by plating. Thereafter, the second cover resin layer 62 is coated on the second branch conductors 42a and 42b and first cover resin layer 61 to cover them.

Figure 6:
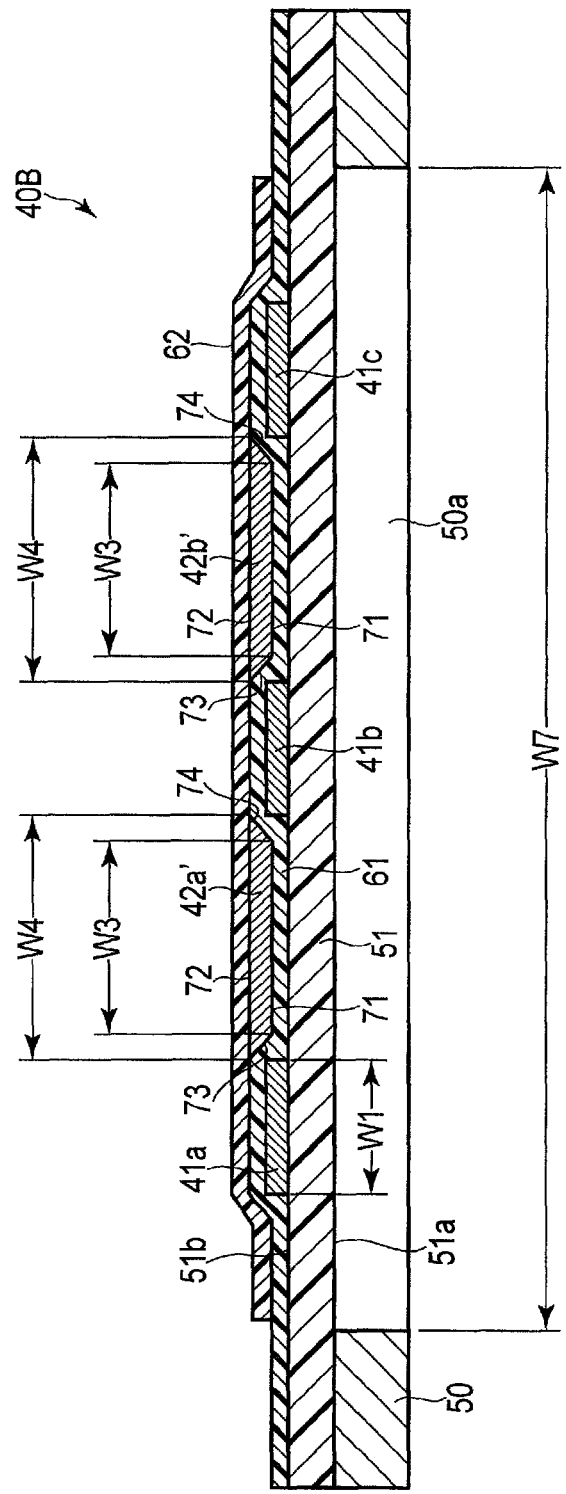
FIG. 6 is a sectional view of an interleaved circuit according to a second embodiment.

FIG. 6 shows an interleaved circuit 40B according to a second embodiment. The cross-section of each of second branch conductors 42a' and 42b' of this interleaved circuit 40B is in the shape of an inverted trapezoid. Specifically, the second branch conductors 42a and 42b' shown in FIG. 6 each comprise a first flat surface portion 71 in contact with a first cover resin layer 61, second flat surface portion 72 opposite to the first flat surface portion 71, and opposite side surfaces 73 and 74. The opposite side surfaces 73 and 74 are inclined so that the distance between them increases with distance from the first flat surface portion 71 toward the second flat surface portion 72. Thus, width W3 of the first flat surface portion 71 is smaller than width W4 of the second flat surface portion 72. Widths W3 and W4 are, for example, 45 µm and 55 µm, respectively. The cross-sections of first branch conductors 41a to 41c are rectangular, and width W1 is, for example, 30 µm.

According to the interleaved circuit 40B constructed in this manner, the distance (interconductor distance) between the first branch conductors 41a to 41c and second branch conductors 42a' and 42b' can be made shorter than interconductor distance G1 according to the first embodiment. Since the other configurations of the interleaved circuit 40B are the same as those of the interleaved circuit 40A of the first embodiment (FIG. 5), common numbers are used to designate common parts of the first and second embodiments, and a repeated description of those parts is omitted.

Figure 7:
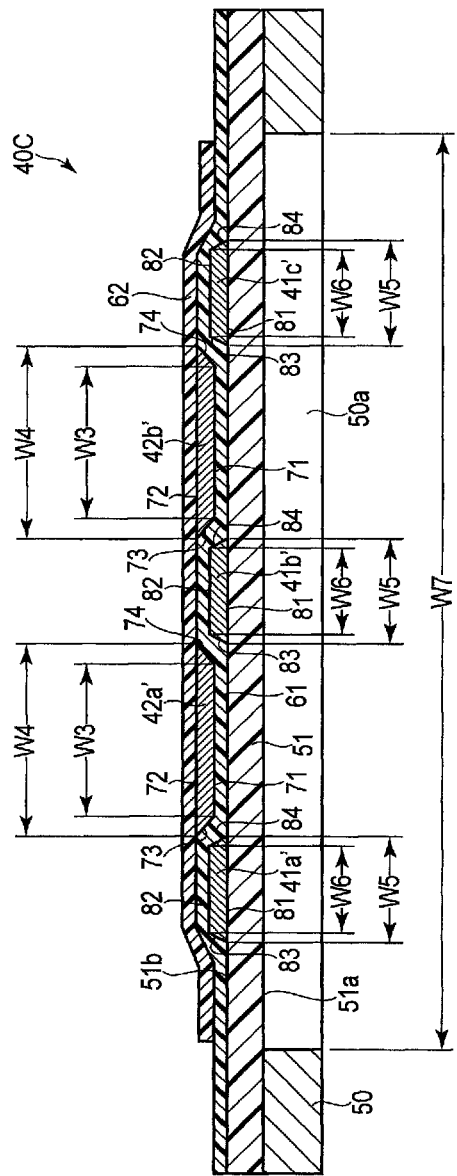
FIG. 7 is a sectional view of an interleaved circuit according to a third embodiment.

FIG. 7 shows an interleaved circuit 40C according to a third embodiment. The cross-section of each of first branch conductors 41a, 41b and 41c' of this interleaved circuit 40C is trapezoidal. Specifically, the first branch conductors 41a' to 41c' shown in FIG. 7 each comprise a first flat surface portion 21 in contact with an insulating layer 51, second flat surface portion 82 opposite to the first flat surface portion 81, and opposite side surfaces 83 and 84. The opposite side surfaces 83 and 84 are inclined so that the distance between them decreases with distance from the first flat surface portion 81 toward the second flat surface portion 82. Thus, width W6 of the second flat surface portion 82 is smaller than width W5 of the first flat surface portion 81. Widths W5 and W6 are, for example, 30 µm and 23 µm, respectively. The cross-section of each of second branch conductors 42a' and 42b', like that of the second embodiment, is in the shape of an inverted trapezoid. Thus, width W3 of a first flat surface portion 71 is smaller than width W4 of a second flat surface portion 72. Widths W3 and W4 are, for example, 45 µm and 62 µm, respectively.

According to the interleaved circuit 400 constructed in this manner, the distance (interconductor distance) between the first branch conductors 41a' to 41c' and second branch conductors 42a' and 42b' can be made shorter than that according to the second embodiment. Since the other configurations of the interleaved circuit 40C are the same as those of the interleaved circuit 40B of the second embodiment (FIG. 6), common numbers are used to designate common parts of the second and third embodiments, and a repeated description of those parts is omitted.

Figure 8:
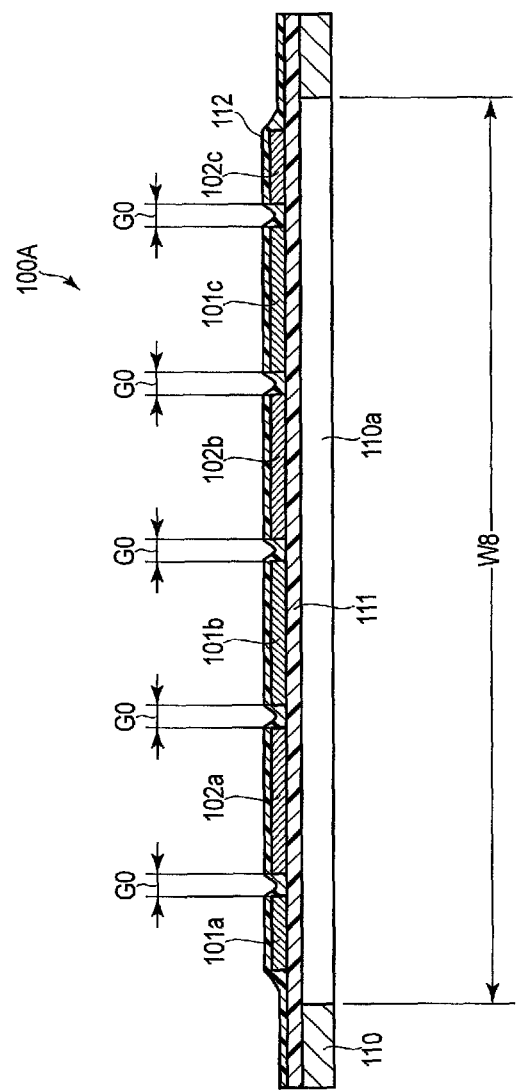
FIG. 8 is a sectional view of an interleaved circuit of a comparative example.

FIG. 8 shows an interleaved circuit 100A of comparative example, which is not disclosed. This interleaved circuit 100A comprises three first branch conductors 101a, 101b and 101c and three second branch conductors 102a, 102b and 102c, which serve to reduce impedance. An insulating layer 111 is formed on a metal base 110 comprising an opening 110a. All the branch conductors 101a to 101c and 102a to 102c are located on the insulating layer 111. The branch conductors 101a to 102c are formed by plating or etching. Since the width of a resist used for this formation can be reduced only limitedly, distance $G_0$ between each two adjacent branch conductors is 15 μm or more.

Figure 9:
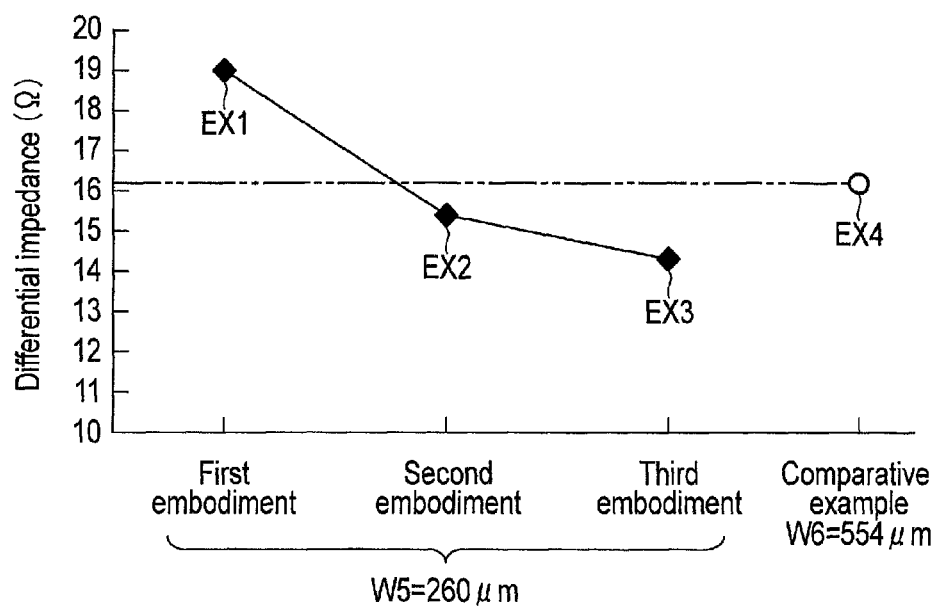
FIG. 9 is a diagram showing differential impedances according to the foregoing embodiments and comparative example.

In FIG. 9, symbols EX1 to EX4 designate differential impedances of the interleaved circuits 40A to 40C according to the first to third embodiments and the interleaved circuit 100A of the comparative example (FIG. 8), respectively. The differential impedance of the interleaved circuit 100A of the comparative example is as low as about 16Ω. Since distance $G_0$ between the branch conductors is as long as 15 μm or more, however, the width of each branch conductor must be increased in order to reduce the impedance. Inevitably, therefore, width W8 of the interleaved circuit 100A is as long as 554 μm.

The differential impedances of the interleaved circuits 40A to 40C of the first to third embodiments are as low as 19, 15 and 14Ω, respectively. As for the widths of the interleaved circuits, width W7 of the interleaved circuits 40A to 40C of the first to third embodiments is 260 μm, which is less than half of width W8 of the comparative example. This is because interconductor distance G1 of the interleaved circuits 40A to 40C of the first to third embodiments is less than one third (5 μm or less) of interconductor distance $G_0$ (15 μm) of the comparative example.

Figure 10:
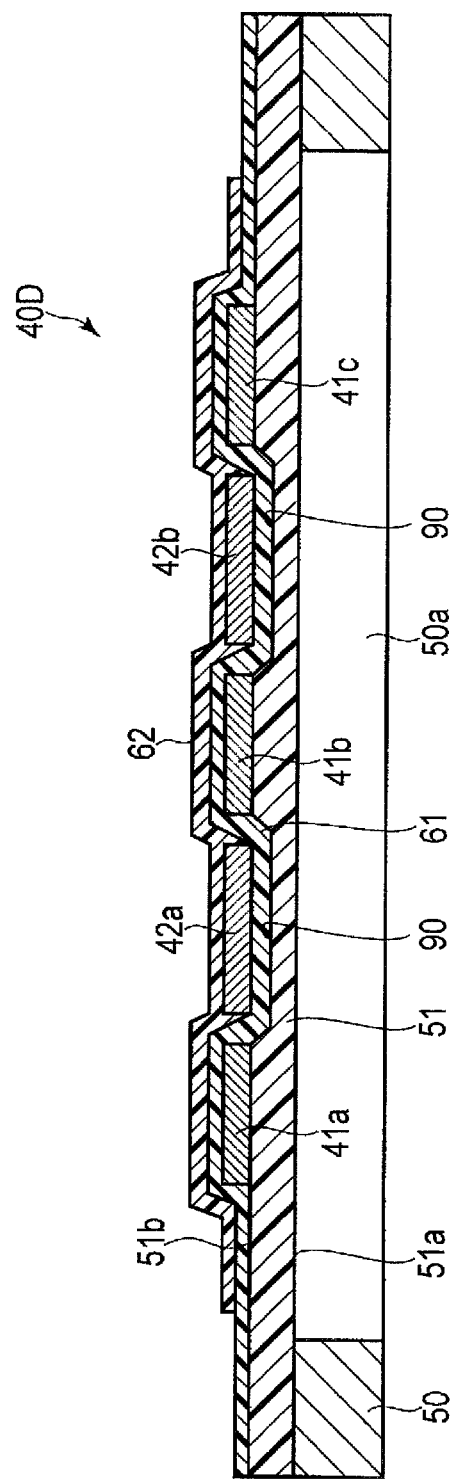
FIG. 10 is a sectional view of an interleaved circuit according to a fourth embodiment.

FIG. 10 shows an interleaved circuit 40D according to a fourth embodiment. This interleaved circuit 40D comprises recesses 90 in a second surface 51b of an insulating layer 51. These recesses 90 are formed individually between first branch conductors 41a, 41b and 41c. A part of a first cover resin layer 61 fills each recess 90. Second branch conductors 42a and 42b are located in positions individually corresponding to the recesses 90 with the first cover resin layer 61 between them.

Thus, in the interleaved circuit 40D of the fourth embodiment, the second branch conductors 42a and 42b are located in the recesses 90, individually. Therefore, the first branch conductors 41a to 41c are flush with the second branch conductors 42a and 42b. Since the other configurations of the interleaved circuit 40D are the same as those of the interleaved circuit 40A of the first embodiment (FIG. 5), common numbers are used to designate common parts of the first and fourth embodiments, and a repeated description of those parts is omitted.

FIG. 11 shows an interleaved circuit 40E according to a fifth embodiment. This interleaved circuit 40E also comprises recesses 90 in a second surface 51b of an insulating layer 51. These recesses 90 are formed individually between first branch conductors 41a, 41b and 41c. A part of a first cover resin layer 61 fills each recess 90. Second branch conductors 42a' and 42b' are located in positions individually corresponding to the recesses 90 with the first cover resin layer 61 between them.

Thus, in the interleaved circuit 40E of the fifth embodiment, the second branch conductors 42a' and 42b' are located in the recesses 90, individually. Therefore, the first branch conductors 41a to 41c are flush with the second branch conductors 42a' and 42b'. Since the other configurations of the interleaved circuit 40E are the same as those of the interleaved circuit 40B of the second embodiment (FIG. 6), common numbers are used to designate common parts of the second and fifth embodiments, and a repeated description of those parts is omitted.

Figure 12:
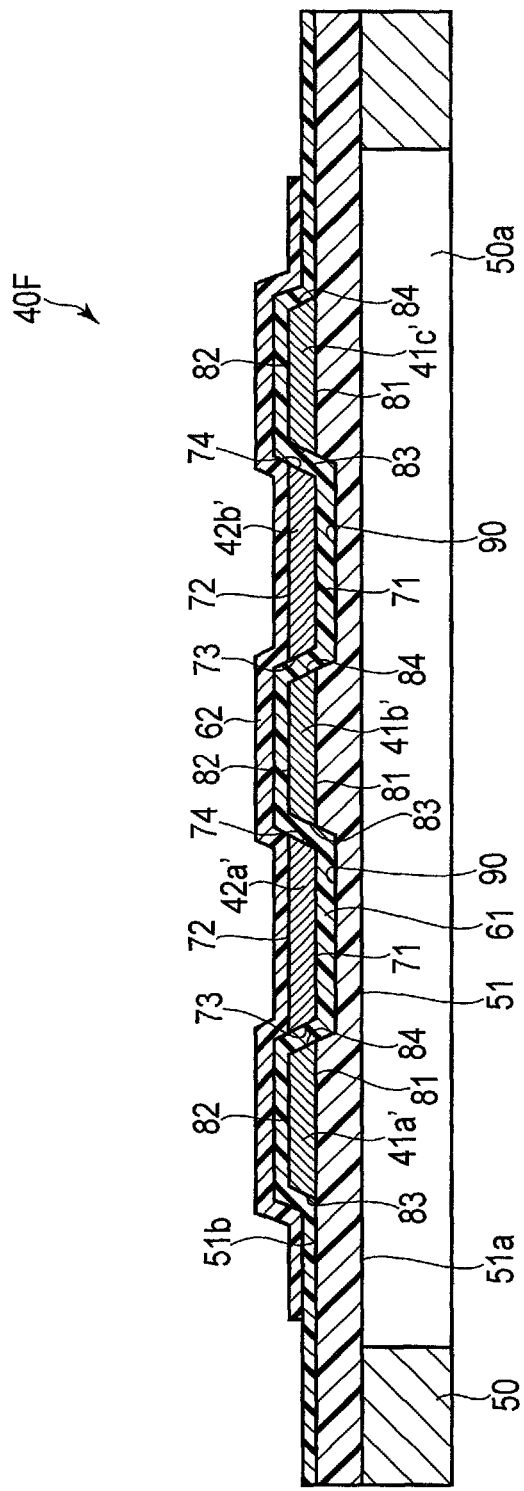
FIG. 12 is a sectional view of an interleaved circuit according to a sixth embodiment.
Figure 13:
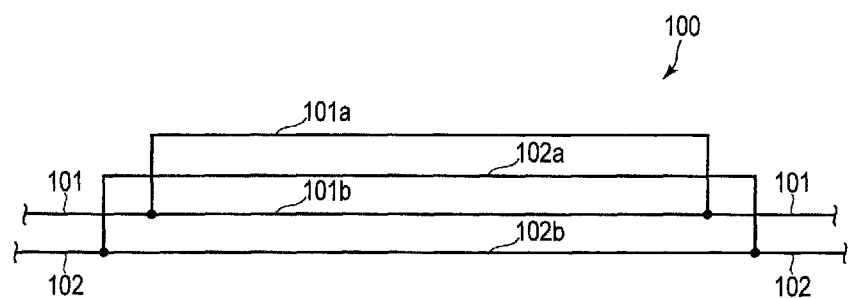
FIG. 13 is a circuit diagram schematically showing a conventional interleaved circuit.
Figure 14:
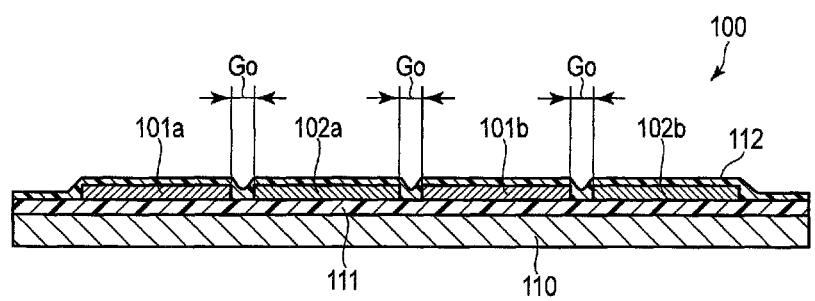
FIG. 14 is a sectional view of the interleaved circuit shown in FIG. 13.

FIG. 12 shows an interleaved circuit 40F according to a sixth embodiment. This interleaved circuit 40F also comprises recesses 90 in a second surface 51b of an insulating layer 51. These recesses 90 are formed individually between first branch conductors 41a', 41b' and 41c'. A part of a first cover resin layer 61 fills each recess 90. Second branch conductors 42a' and 42b' are located in positions individually corresponding to the recesses 90 with the first cover resin layer 61 between them.

Thus, in the interleaved circuit 40F of the sixth embodiment, the second branch conductors 42a and 42b' located in the recesses 90, individually. Therefore, the first branch conductors 41a' to 41c' are flush with the second branch conductors 42a' and 42b'. Since the other configurations of the interleaved circuit 40F are the same as those of the interleaved circuit 40C of the third embodiment (FIG. 7), common numbers are used to designate common parts of the third and sixth embodiments, and a repeated description of those parts is omitted.

According to the interleaved circuits 40A to 40F of the first to sixth embodiments, as described above, impedance reduction can be achieved and the circuit width can be made smaller than in the conventional case. Thus, an interleaved circuit serves to increase the design flexibility of a flexure that comprises it and can be applied to a narrow flexure with conductors.

It is to be understood, in carrying out the present invention, that the constituent elements of the invention, including the first and second conductors, first and second branch conductors, first and second cover resin layers, etc., as well as the metal base and insulating layer that constitute the flexure, may be embodied in various modified forms without departing from the spirit of the invention. Further, the first branch conductors may be equal in number and/or width to the second branch conductors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interleaved circuit of a flexure for a disk drive, which comprises a first conductor and a second conductor, the interleaved circuit comprising:
   a metal base comprising an opening;
   an electrically insulating layer located overlapping that region of the metal base which comprises the opening and comprising a first surface facing the metal base and a second surface opposite to the first surface;
   a plurality of first branch conductors branching from the first conductor and arranged at predetermined intervals on the second surface of the insulating layer;
   an electrically insulating first cover resin layer which covers the first branch conductors and the insulating layer;
   second branch conductors branching from the second conductor and formed individually between the adjacent first branch conductors on the first cover resin layer; and
   an electrically insulating second cover resin layer which covers the second branch conductors and the first cover resin layer.

2. The interleaved circuit of claim 1, wherein each of the second branch conductors comprises a first flat surface portion in contact with the first cover resin layer, a second flat surface portion opposite to the second flat surface portion, and opposite side surfaces, the opposite side surfaces being inclined so that a distance therebetween increases with distance from the first flat surface portion toward the second flat surface portion.

3. The interleaved circuit of claim 2, wherein each of the first branch conductors comprises a first flat surface portion in contact with the insulating layer, a second flat surface portion opposite to the first flat surface portion, and opposite side surfaces, the opposite side surfaces being inclined so that a distance therebetween decreases with distance from the first flat surface portion of the first branch conductors toward the second flat surface portion.

4. The interleaved circuit of claim 3, wherein the insulating layer comprises recesses formed individually in those parts of the second surface between the first branch conductors, and the second branch conductors are located in positions individually corresponding to the recesses with the first cover resin layer therebetween.

5. The interleaved circuit of claim 3, wherein the second branch conductors are one less in number than the first branch conductors and are located individually between the adjacent first branch conductors.

6. The interleaved circuit of claim 5, wherein each of the second branch conductors is wider than each of the first branch conductors.

7. The interleaved circuit of claim 2, wherein the insulating layer comprises recesses formed individually in those parts of the second surface between the first branch conductors, and the second branch conductors are located in positions individually corresponding to the recesses with the first cover resin layer therebetween.

8. The interleaved circuit of claim 2, wherein the second branch conductors are one less in number than the first branch conductors and are located individually between the adjacent first branch conductors.

9. The interleaved circuit of claim 8, wherein each of the second branch conductors is wider than each of the first branch conductors.

10. The interleaved circuit of claim 1, wherein the insulating layer comprises recesses formed individually in those parts of the second surface between the first branch conductors, and the second branch conductors are located in positions individually corresponding to the recesses with the first cover resin layer therebetween.

11. The interleaved circuit of claim 10, wherein the second branch conductors are one less in number than the first branch conductors and are located individually between the adjacent first branch conductors.

12. The interleaved circuit of claim 11, wherein each of the second branch conductors is wider than each of the first branch conductors.

13. The interleaved circuit of claim 1, wherein the second branch conductors are one less in number than the first branch conductors and are located individually between the adjacent first branch conductors.

14. The interleaved circuit of claim 13, wherein each of the second branch conductors is wider than each of the first branch conductors.

15. The interleaved circuit of claim 1, wherein each of the first branch conductors is equal in thickness to each of the second branch conductors and the distance between the first and second branch conductors is less than the thickness thereof.

* * * * *